(12) United States Patent  (10) Patent No.: US 8,411,083 B2
Bendall  (45) Date of Patent: Apr. 2, 2013

(54) METHOD AND DEVICE FOR DISPLAYING AN INDICATION OF THE QUALITY OF THE THREE-DIMENSIONAL DATA FOR A SURFACE OF A VIEWED OBJECT

(75) Inventor: Clark A. Bendall, Syracuse, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/081,220

(22) Filed: Apr. 6, 2011

(65) Prior Publication Data

US 2012/0256901 A1  Oct. 11, 2012

(51) Int. Cl.
  *G06T 15/00* (2011.01)
(52) U.S. Cl. ........ 345/419; 345/420; 345/423; 345/427; 345/428; 345/582
(58) Field of Classification Search .................. 345/419, 345/420, 424, 427, 582, 423, 428
See application file for complete search history.

(56) References Cited

U.S. PATENT DOCUMENTS

| | | | | |
|---|---|---|---|---|
| 6,201,541 | B1 * | 3/2001 | Shalom et al. | 345/419 |
| 6,717,578 | B1 * | 4/2004 | Deering | 345/428 |
| 6,956,576 | B1 * | 10/2005 | Deering et al. | 345/475 |
| 7,453,456 | B2 * | 11/2008 | Petrov et al. | 345/419 |
| 7,474,803 | B2 * | 1/2009 | Petrov et al. | 382/285 |
| 7,755,817 | B2 * | 7/2010 | Ho et al. | 358/523 |
| 7,812,968 | B2 | 10/2010 | Bendall et al. | |
| 7,821,649 | B2 | 10/2010 | Bendall et al. | |
| 7,855,732 | B2 * | 12/2010 | Williams et al. | 348/211.7 |
| 2008/0198159 | A1 * | 8/2008 | Liu et al. | 345/420 |
| 2009/0225321 | A1 | 9/2009 | Bendall et al. | |
| 2009/0225329 | A1 | 9/2009 | Bendall et al. | |
| 2009/0225333 | A1 | 9/2009 | Bendall et al. | |

FOREIGN PATENT DOCUMENTS

EP  00888522 A1  1/1999

OTHER PUBLICATIONS

Yerex et al. "Predictive Display Models for Tele-Manipulation from Uncalibrated Camera-Capture of Scene Geometry and Appearance". IEEE 2003.*
Cobzas et al. "A Panoramic Model for Remote Robot Environment Mapping and Predictive Display". Published 2005.*

* cited by examiner

*Primary Examiner* — Kimbinh T Nguyen
(74) *Attorney, Agent, or Firm* — Hiscock & Barclay LLP (57) ABSTRACT

A method and device for displaying an indication of the quality of the three-dimensional data for a surface of a viewed object are disclosed, wherein overlays are displayed on pixels of an image corresponding to surface points, indicating the predicted accuracy or availability of the three-dimensional coordinates of those surface points.

20 Claims, 5 Drawing Sheets

METHOD AND DEVICE FOR DISPLAYING AN INDICATION OF THE QUALITY OF THE THREE-DIMENSIONAL DATA FOR A SURFACE OF A VIEWED OBJECT

BACKGROUND OF THE INVENTION

The subject matter disclosed herein relates to a method and device for displaying an indication of the quality of the three-dimensional data for a surface of a viewed object.

Video inspection devices, such as video endoscopes, can be used to inspect a surface of a viewed object to identify and analyze irregularities on that surface that may have resulted from damage or wear of the object. In many instances, the surface is inaccessible and cannot be viewed without the use of the video inspection device. For example, a video endoscope can be used to inspect the surface of a blade of a turbine engine on an aircraft or power generation unit to identify any irregularities that may have formed on the surface to determine if any repair or further maintenance is required. In order to make that assessment, it is often necessary to obtain highly accurate dimensional measurements of the surface and the irregularity to verify that the irregularity does not exceed or fall outside an operational limit or required specification for that object.

In order to determine the dimensions of an irregularity on the surface, a video inspection device can be used to obtain and display a two-dimensional image of a surface of a viewed object showing the irregularity. This two-dimensional image of the surface can be used to generate three-dimensional data (e.g., in the form of a map) of the surface that provides the three-dimensional coordinates (e.g., (x, y, z)) of a plurality of points on the surface, including in a region of interest on the surface (e.g., proximate an irregularity). In some video inspection devices, the operator can operate the video inspection device in a measurement mode to enter a measurement screen in which the operator places cursors on the two-dimensional image in the region of interest to determine geometric dimensions of the irregularity. In addition to performing measurements during the inspection in measurement mode, the operator can also save images without necessarily entering into measurement mode and perform measurements at a later time.

An accurate measurement of the irregularity can only be performed if there are accurate three-dimensional coordinates available for the surface points proximate the irregularity that are selected to perform the measurement. For example, in some areas of the surface, three-dimensional coordinates may not be available due to excessive target distance, pixel saturation, shadowing, etc. In other areas, three-dimensional coordinates may be available, but the accuracy of those coordinates may be poor due to reflections, other light quality issues, etc. When an operator views the two-dimensional image of the surface to perform measurements, there is no indication of which areas do not have three-dimensional coordinates to perform a measurement or those areas that have potentially inaccurate three-dimensional coordinates.

Without this indication of the quality of the three-dimensional data for the surface, while taking a measurement, the operator can unknowingly place the cursor in an area where there are no three-dimensional coordinates or in an area where there are inaccurate three-dimensional coordinates. This can lead to inaccurate measurements or, in those cases where the video inspection device notifies the operator that there are no three-dimensional coordinates available, delays the measurement process until the operator can obtain another image with accurate three-dimensional data. If the operator is performing measurements on an image that was saved during an earlier inspection and the region of interest does not have accurate three-dimensional data, a measurement may not be able to be performed without having to re-perform the inspection. Therefore, there is a need to provide an indication of the quality of the three-dimensional data for the surface while performing measurements or saving images for later measurement.

The discussion above is merely provided for general background information and is not intended to be used as an aid in determining the scope of the claimed subject matter.

BRIEF DESCRIPTION OF THE INVENTION

A method and device for displaying an indication of the quality of the three-dimensional data for a surface of a viewed object are disclosed, wherein overlays are displayed on pixels of an image corresponding to surface points, indicating the predicted accuracy or availability of the three-dimensional coordinates of those surface points.

In one exemplary embodiment, a method for displaying an indication of the quality of the three-dimensional data for a surface of a viewed object is disclosed. The method comprises the steps of obtaining and displaying an image of the surface of the viewed object, wherein a plurality of pixels of the image correspond to a plurality of surface points on the viewed object, determining the three-dimensional coordinates of the plurality of surface points, determining an accuracy value for each of the plurality of pixels corresponding to the plurality of surface points, wherein the accuracy value is based on the predicted accuracy of the three-dimensional coordinates of the surface point corresponding to the pixel, determining for each of the plurality of pixels having an accuracy value whether the accuracy value is outside of a range of acceptable accuracy values, and displaying an overlay for each of the plurality of pixels whose accuracy value is outside of the range of acceptable accuracy values.

In another exemplary embodiment, the method for displaying an indication of the quality of the three-dimensional data for a surface of a viewed object comprises the steps of obtaining and displaying an image of the surface of the viewed object, wherein a plurality of pixels of the image correspond to a plurality of surface points on the viewed object, determining for each of the plurality of pixels corresponding to the plurality of surface points whether the three-dimensional coordinates for the surface point corresponding to the pixel are available, and displaying a first overlay for each pixel where the three-dimensional coordinates for the surface point corresponding to the pixel are not available.

In yet another exemplary embodiment, a device for displaying an indication of the quality of the three-dimensional data for a surface of a viewed object is disclosed. The device comprises an imager for obtaining an image of the surface of the viewed object; wherein a plurality of pixels of the image correspond to a plurality of surface points on the viewed object, a central processor unit for determining the three-dimensional coordinates of the plurality of surface points, determining an accuracy value for each of the plurality of pixels corresponding to the plurality of surface points, wherein the accuracy value is based on the predicted accuracy of the three-dimensional coordinates of the surface point corresponding to the pixel, and determining for each of the plurality of pixels having an accuracy value whether the accuracy value is outside of a range of acceptable accuracy values, and a monitor for displaying an image of the surface of the viewed object and an overlay for each of the plurality of pixels whose accuracy value is outside of the range of acceptable accuracy values.

This brief description of the invention is intended only to provide a brief overview of subject matter disclosed herein according to one or more illustrative embodiments, and does not serve as a guide to interpreting the claims or to define or limit the scope of the invention, which is defined only by the appended claims. This brief description is provided to introduce an illustrative selection of concepts in a simplified form that are further described below in the detailed description. This brief description is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

So that the manner in which the features of the invention can be understood, a detailed description of the invention may be had by reference to certain embodiments, some of which are illustrated in the accompanying drawings. It is to be noted, however, that the drawings illustrate only certain embodiments of this invention and are therefore not to be considered limiting of its scope, for the scope of the invention encompasses other equally effective embodiments. The drawings are not necessarily to scale, emphasis generally being placed upon illustrating the features of certain embodiments of invention. In the drawings, like numerals are used to indicate like parts throughout the various views. Thus, for further understanding of the invention, reference can be made to the following detailed description, read in connection with the drawings in which.

DETAILED DESCRIPTION OF THE INVENTION

A method and device for displaying an indication of the quality of the three-dimensional data for a surface of a viewed object are disclosed, wherein overlays are displayed on pixels of an image corresponding to surface points, indicating the predicted accuracy or availability of the three-dimensional coordinates of those surface points. An advantage that may be realized in the practice of some disclosed embodiments of the method and device is that the operator of a video inspection device will know which areas of a surface have accurate three-dimensional data while performing measurements or saving images for later measurement.

Figure 1:
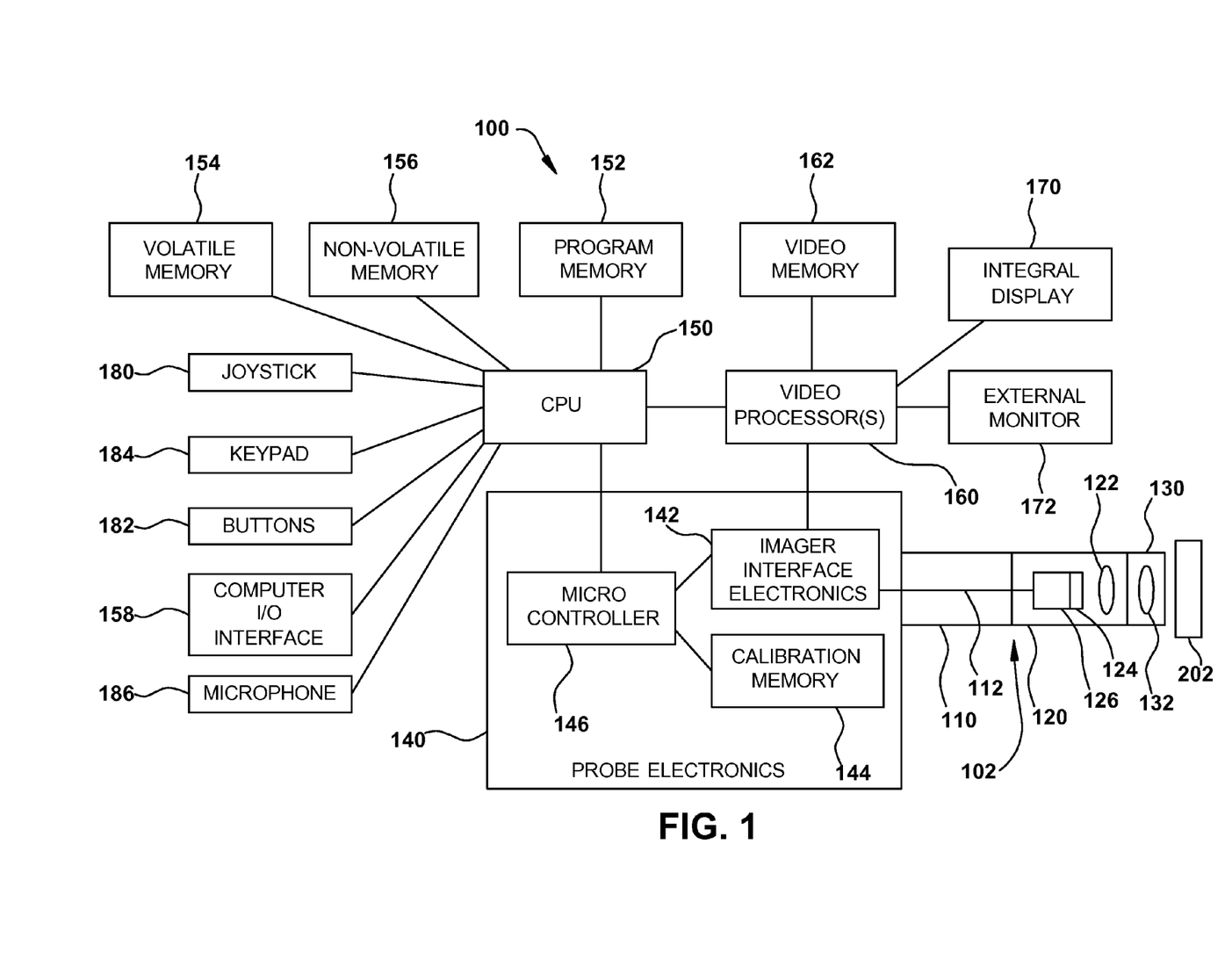
FIG. 1 is a block diagram of a video inspection device in an exemplary embodiment of the invention.

FIG. 1 is a block diagram of a video inspection device 100 in an exemplary embodiment of the invention. It will be understood that the video inspection device 100 shown in FIG. 1 is exemplary and that the scope of the invention is not limited to any particular video inspection device 100 or any particular configuration of components within a video inspection device 100.

Video inspection device 100 can include an elongated probe 102 comprising an insertion tube 110 and a head assembly 120 disposed at the distal end of the insertion tube 110. Insertion tube 110 can be a flexible, tubular section through which all interconnects between the head assembly 120 and probe electronics 140 are passed. Head assembly 120 can include probe optics 122 for guiding and focusing light from the viewed object 202 onto an imager 124. The probe optics 122 can comprise, e.g., a lens singlet or a lens having multiple components. The imager 124 can be a solid state CCD or CMOS image sensor for obtaining an image of the viewed object 202.

A detachable tip 130 or adaptor can be placed on the distal end of the head assembly 120. The detachable tip 130 can include tip viewing optics 132 (e.g., lenses, windows, or apertures) that work in conjunction with the probe optics 122 to guide and focus light from the viewed object 202 onto an imager 124. The detachable tip 130 can also include illumination LEDs (not shown) if the source of light for the video inspection device 100 emanates from the tip 130 or a light passing element (not shown) for passing light from the probe 102 to the viewed object 202. The tip 130 can also provide the ability for side viewing by including a waveguide (e.g., a prism) to turn the camera view and light output to the side. The tip 130 may also provide stereoscopic optics or structured light projecting elements for use in determining three dimensional data of the viewed surface. The elements that can be included in the tip 130 can also be included in the probe 102 itself.

The imager 124 can include a plurality of pixels formed in a plurality of rows and columns and can generate image signals in the form of analog voltages representative of light incident on each pixel of the imager 124. The image signals can be propagated through imager hybrid 126, which provides electronics for signal buffering and conditioning, to an imager harness 112, which provides wires for control and video signals between the imager hybrid 126 and the imager interface electronics 142. The imager interface electronics 142 can include power supplies, a timing generator for generating imager clock signals, an analog front end for digitizing the imager video output signal, and a digital signal processor for processing the digitized imager video data into a more useful video format.

The imager interface electronics 142 are part of the probe electronics 140, which provide a collection of functions for operating the video inspection device 100. The probe electronics 140 can also include a calibration memory 144, which stores the calibration data for the probe 102 and/or tip 130. The microcontroller 146 can also be included in the probe electronics 140 for communicating with the imager interface electronics 142 to determine and set gain and exposure settings, storing and reading calibration data from the calibration memory 144, controlling the light delivered to the viewed object 202, and communicating with the CPU 150 of the video inspection device 100.

In addition to communicating with the microcontroller 146, the imager interface electronics 142 can also communicate with one or more video processors 160. The video processor 160 can receive a video signal from the imager interface electronics 142 and output signals to various monitors 170, 172, including an integral display 170 or an external monitor 172. The integral display 170 can be an LCD screen built into the video inspection device 100 for displaying various images or data (e.g., the image of the viewed object 202, menus, cursors, measurement results) to an inspector. The external monitor 172 can be a video monitor or computer-type monitor connected to the video inspection device 100 for displaying various images or data.

The video processor 160 can provide/receive commands, status information, streaming video, still video images, and graphical overlays to/from the CPU 150 and may be comprised of FPGAs, DSPs, or other processing elements which provide functions such as image capture, image enhancement, graphical overlay merging, distortion correction, frame averaging, scaling, digital zooming, overlaying, merging, flipping, motion detection, and video format conversion and compression.

The CPU 150 can be used to manage the user interface by receiving input via a joystick 180, buttons 182, keypad 184, and/or microphone 186, in addition to providing a host of other functions, including image, video, and audio storage and recall functions, system control, and measurement processing. The joystick 180 can be manipulated by the operator to perform such operations as menu selection, cursor movement, slider adjustment, and articulation control of the probe 102, and may include a push-button function. The buttons 182 and/or keypad 184 also can be used for menu selection and providing user commands to the CPU 150 (e.g., freezing or saving a still image). The microphone 186 can be used by the inspector to provide voice instructions to freeze or save a still image.

The video processor 160 can also communicate with video memory 162, which is used by the video processor 160 for frame buffering and temporary holding of data during processing. The CPU 150 can also communicate with CPU program memory 152 for storage of programs executed by the CPU 150. In addition, the CPU 150 can be in communication with volatile memory 154 (e.g., RAM), and non-volatile memory 156 (e.g., flash memory device, a hard drive, a DVD, or an EPROM memory device). The non-volatile memory 156 is the primary storage for streaming video and still images.

The CPU 150 can also be in communication with a computer I/O interface 158, which provides various interfaces to peripheral devices and networks, such as USB, Firewire, Ethernet, audio I/O, and wireless transceivers. This computer I/O interface 158 can be used to save, recall, transmit, and/or receive still images, streaming video, or audio. For example, a USB "thumb drive" or CompactFlash memory card can be plugged into computer I/O interface 158. In addition, the video inspection device 100 can be configured to send frames of image data or streaming video data to an external computer or server. The video inspection device 100 can incorporate a TCP/IP communication protocol suite and can be incorporated in a wide area network including a plurality of local and remote computers, each of the computers also incorporating a TCP/IP communication protocol suite. With incorporation of TCP/IP protocol suite, the video inspection device 100 incorporates several transport layer protocols including TCP and UDP and several different layer protocols including HTTP and FTP.

Figure 2:
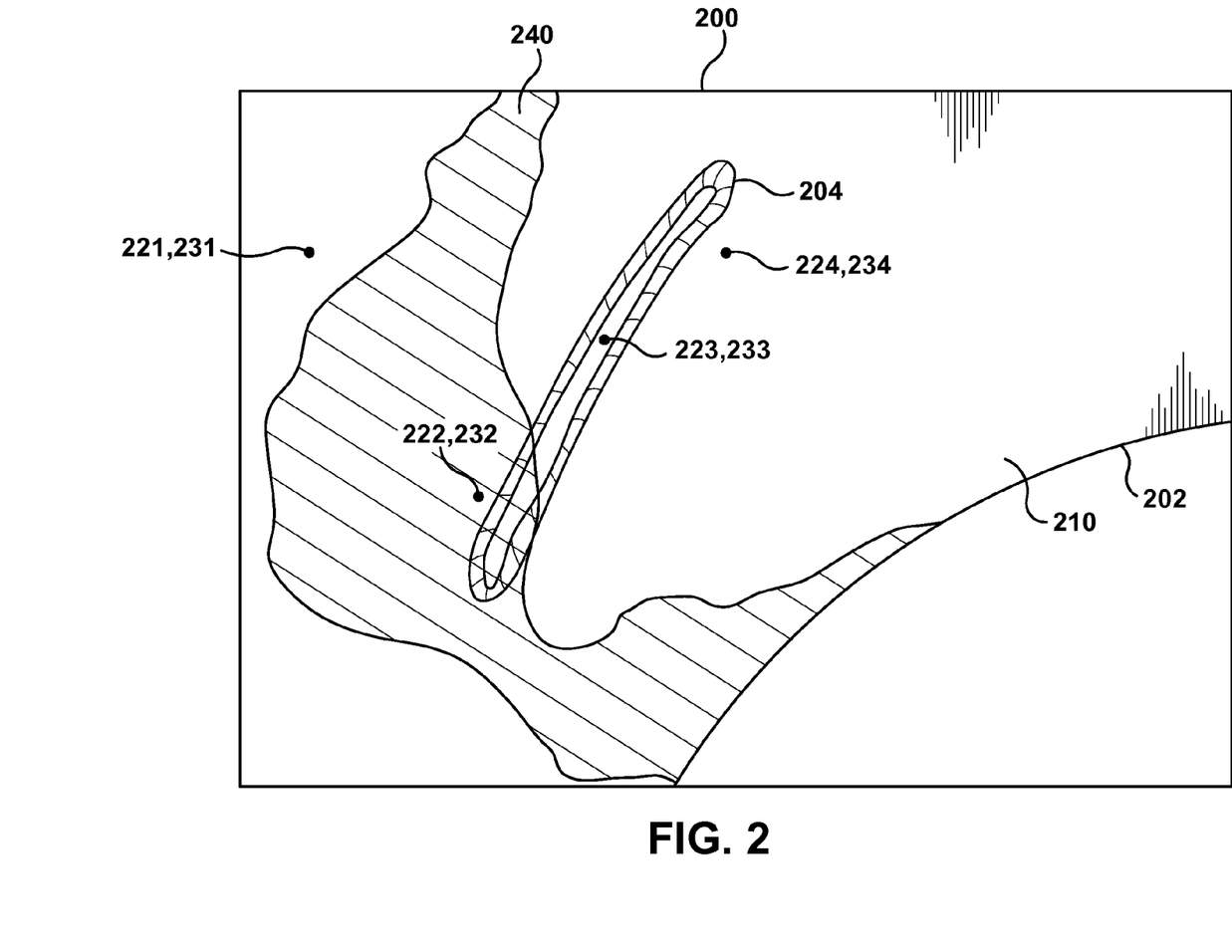
FIG. 2 is an image obtained by the video inspection device of a surface of a viewed object having an irregularity displaying an overlay to indicate the quality of the three-dimensional data for the surface in an exemplary embodiment of the invention.

FIG. 2 is an image 200 obtained by video inspection device 100 of the surface 210 of a viewed object 202 having an irregularity 204 displaying an accuracy overlay 240 to indicate the quality of the three-dimensional data for the surface 210 in an exemplary embodiment of the invention. In this example, the irregularity 204 is shown as a crack, where material has been removed from the surface 210 of the viewed object 202 in the irregularity 204 by damage or wear. It will be understood that the irregularity 204 shown in this exemplary embodiment is just an example and that the inventive method applies to other types of irregularities (e.g., dents, corrosion pitting, coating loss, surface deposits, etc.). Once the image 200 is obtained, and the irregularity 204 is identified, the image 200 can be used to determine the dimensions of the irregularity 204 (e.g., height or depth, length, width, area, volume, point to line, profile slice, etc.). In one embodiment, the image 200 used can be a two-dimensional image 200 of the surface 210 of the viewed object 202, including the irregularity 204.

Figure 3:
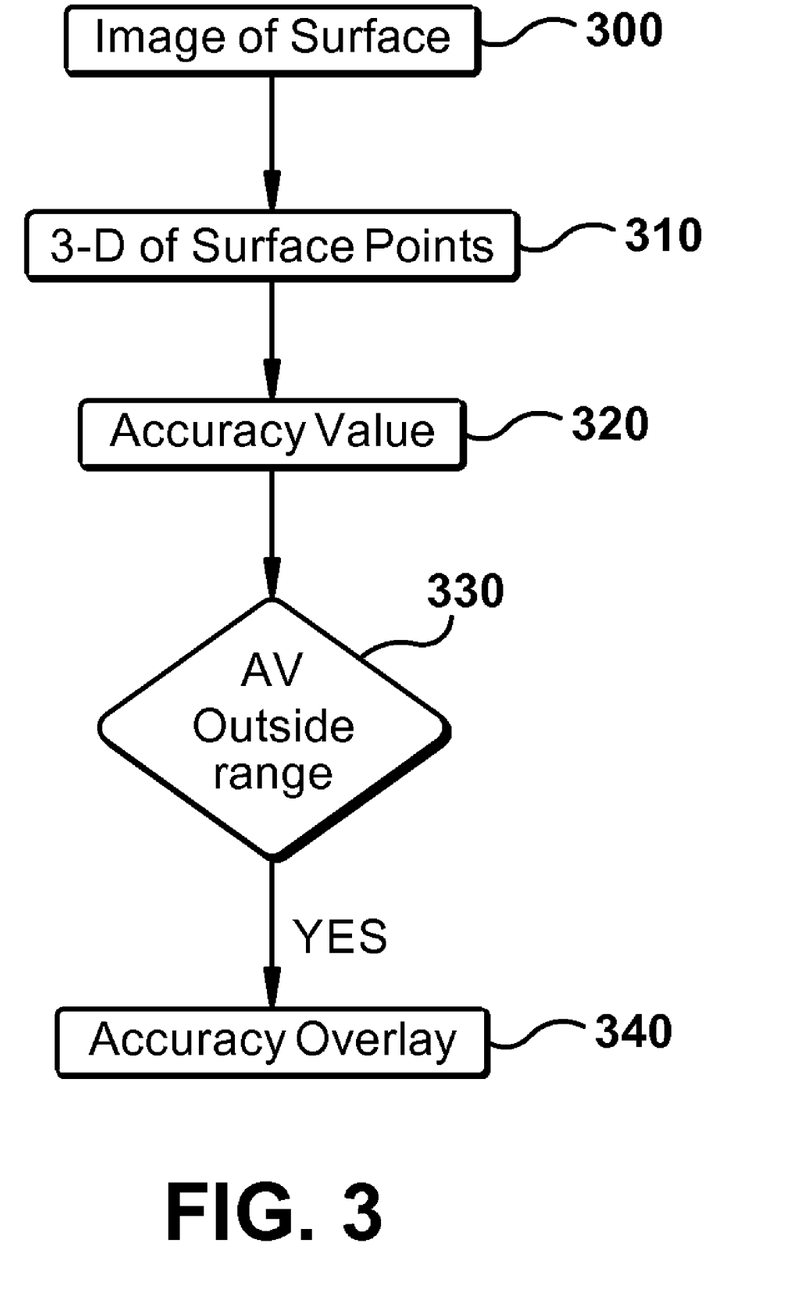
FIG. 3 is a flow diagram of a method for displaying an indication of the quality of the three-dimensional data for a surface of the viewed object shown in the image of FIG. 2 in an exemplary embodiment of the invention.

FIG. 3 is a flow diagram of a method for displaying an indication of the quality of the three-dimensional data for a surface 210 of the viewed object 202 shown in the image of FIG. 2 in an exemplary embodiment of the invention. It will be understood that the steps described in the flow diagram of FIG. 3 can be performed in a different order than shown in the flow diagram and that not all of the steps are required for certain embodiments.

At step 300, and as shown in FIG. 2, the imager 124 of the video inspection device 100 can obtain an image 200 of the surface 210 of a viewed object 202 having an irregularity 204 and display it on a video monitor (e.g., an integral display 170 or external monitor 172). As shown in FIG. 2, a plurality of pixels 231, 232, 233, 234 of the image 200 correspond to a plurality of surface points 221, 222, 223, 224 on the viewed object 202. In one embodiment, the image 200 can have approximately 400,000 pixels.

At step 310, the CPU 150 of the video inspection device 100 can determine the three-dimensional coordinates ($x_i$, $y_i$, $z_i$) of a plurality of surface points 221, 222, 223, 224 on the surface 210 of the viewed object 202, including proximate the irregularity 204. Several different existing techniques can be used to provide the three-dimensional coordinates ($x_i$, $y_i$, $z_i$) of the surface points 221, 222, 223, 224 (e.g., stereo, scanning systems, structured light methods such as phase shifting, phase shift moiré, laser dot projection, etc.). Most such techniques comprise the use of calibration data, which, among other things, includes optical characteristic data that is used to reduce errors in the three-dimensional coordinates that would otherwise be induced by optical distortions. With some techniques, the three-dimensional coordinates may be determined using one or more images captured in close time proximity that may include projected patterns and the like. It is to be understood that references to three-dimensional coordinates determined using image 200 may also comprise three-dimensional coordinates determined using one or a plurality of images 200 of the surface 210 captured in close time proximity, and that the image 200 displayed to the operator during the described operations may or may not actually be used in the determination of the three-dimensional coordinates.

In one embodiment, the CPU 150 of the video inspection device 100 determines a first set of three-dimensional coordinates ($x_{i1}$, $y_{i1}$, $z_{i1}$) of the plurality of surface points and a second set of three-dimensional coordinates ($x_{i2}$, $y_{i2}$, $z_{i2}$) of the plurality of surface points, including surface points 221, 222, 223, 224.

At step 320, the CPU 150 of the video inspection device 100 can determine an accuracy value (AV) for each of the plurality of pixels 231, 232, 233, 234 corresponding to the plurality of surface points 221, 222, 223, 224, wherein the accuracy value is based on the predicted accuracy of the three-dimensional coordinates $(x_i, y_i, z_i)$ of the surface point 221, 222, 223, 224 corresponding to the pixel 231, 232, 233, 234.

In one embodiment, the accuracy value for a pixel 231, 232, 233, 234 can be the difference between at least one of the three-dimensional coordinates from a first set of three-dimensional coordinates $(x_{i1}, y_{i1}, z_{i1})$ of the surface point 221, 222, 223, 224 corresponding to the pixel and at least one of the three-dimensional coordinates from a second set of three-dimensional coordinates $(X_{i2}, y_{i2}, z_{i2})$ of the surface point 221, 222, 223, 224 corresponding to the pixel 231, 232, 233, 234. The three-dimensional coordinates for the same surface point 221, 222, 223, 224 from different sets of coordinates may be different due to reflections, other light quality issues, etc.

In one embodiment, the accuracy value (AV) for a particular pixel 231, 232, 233, 234 can be determined by the difference between the z values $(z_{i1}, z_{i2})$ for that pixel 231, 232, 233, 234:

$$AV = \frac{|z_{i1} - z_{i2}|}{\left|\frac{z_{i1} + z_{i2}}{2}\right|} \quad (1)$$

In this example, the greater the difference between the z values $(z_{i1}, z_{i2})$, the greater the accuracy value (AV), and the lower the predicted accuracy of those three-dimensional coordinates $(x_i, y_i, z_i)$ for that pixel 231, 232, 233, 234.

In another embodiment (e.g., where stereo techniques are used to determine the three-dimensional coordinates $(x_i, y_i, z_i)$), the accuracy value for a pixel 231, 232, 233, 234 can be determined by determining whether, for a particular surface point 221, 222, 223, 224 in one stereo image, whether a distinct match exists in the other stereo image. For example, if a matching pixel is identified through correlation techniques but that matching pixel is only marginally better or different than the match that would be provided by one or more adjacent pixels, that would indicate a lower predicted accuracy of the three-dimensional coordinates $(x_i, y_i, z_i)$ for that pixel 231, 232, 233, 234.

At step 330, the CPU 150 of the video inspection device 100 can determine for each of the plurality of pixels 231, 232, 233, 234 having an accuracy value whether the accuracy value is outside of a range of acceptable accuracy values. In one embodiment where the accuracy value for a pixel 231, 232, 233, 234 is the difference between the z values $(z_{i1}, z_{i2})$ for that pixel 231, 232, 233, 234 as shown in equation (1), the range of acceptable values (AV) can be less than 0.10 or ten percent. In another embodiment, the range of acceptable values (AV) can be less than 0.15 or fifteen percent. It will be understood that this accuracy value and range of acceptable accuracy values is exemplary and that the scope of the invention is not limited to any particular accuracy value determination.

At step 340, and as shown in FIG. 2, the monitor 170, 172 of the video inspection device 100 can display an accuracy overlay 240 for each of the plurality of pixels 232 whose accuracy value is outside of the range of acceptable accuracy values as determined at step 330. In FIG. 2, for example, pixel 232 corresponding to surface point 222 has an accuracy value that is outside of the range of acceptable accuracy values. This accuracy overlay 240 can be displayed on the image 200 at all times or only at certain times (e.g., when a cursor is moved over a pixel 232 whose accuracy value is outside of the range of acceptable accuracy values) or when an operator saves an image 200). The presence of this accuracy overlay 240 allows an operator to determine whether the image 200 has accurate three-dimensional data to perform a measurement in the region of interest on the surface 210 (e.g., proximate the irregularity 204).

In one embodiment, the accuracy overlay 240 for all of the plurality of pixels 232 whose accuracy value is outside of the range of acceptable accuracy values is the same color (e.g., yellow). In another embodiment, the accuracy overlay 240 for each of the plurality of pixels 232 whose accuracy value is outside of the range of acceptable accuracy values is colored based on the accuracy value for that pixel and can comprise different colors or different shades of colors. For example, a pixel 232 with an accuracy value of 0.16 (i.e., relatively higher predicted accuracy) may be a lighter shade of yellow than a pixel 232 with an accuracy value of 0.36 (i.e., relatively lower predicted accuracy), which may be a darker shade of yellow. In one embodiment, certain ranges of accuracy values can correspond to certain colors or shades of colors.

Figure 4:
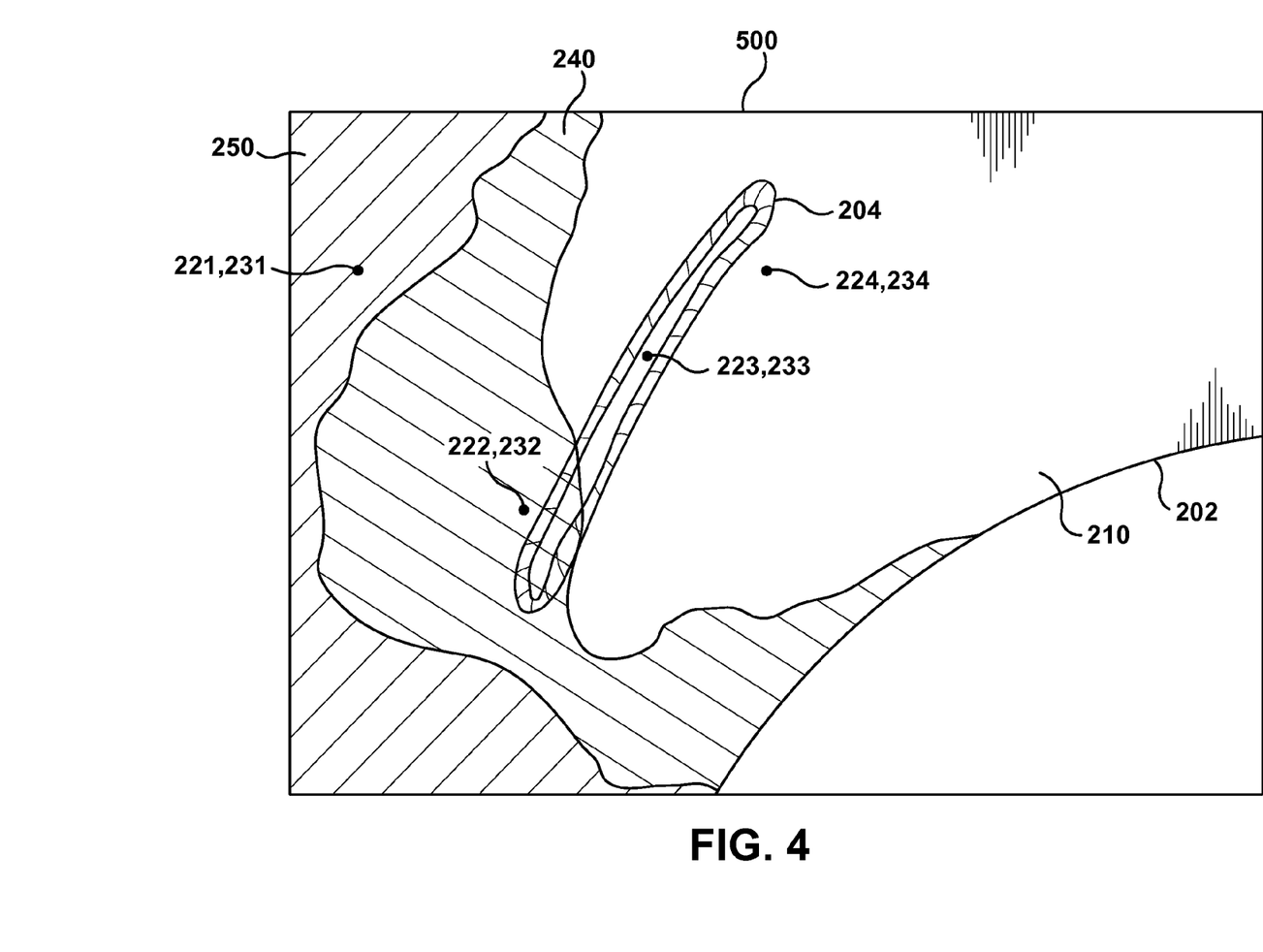
FIG. 4 is an image obtained by the video inspection device of a surface of a viewed object having an irregularity displaying overlays to indicate the quality of the three-dimensional data for the surface in another exemplary embodiment of the invention.

FIG. 4 is an image 500 obtained by the video inspection device 100 of a surface 210 of a viewed object 202 having an irregularity 204 displaying overlays 240, 250 to indicate the quality of the three-dimensional data for the surface 210 in another exemplary embodiment of the invention.

Figure 5:
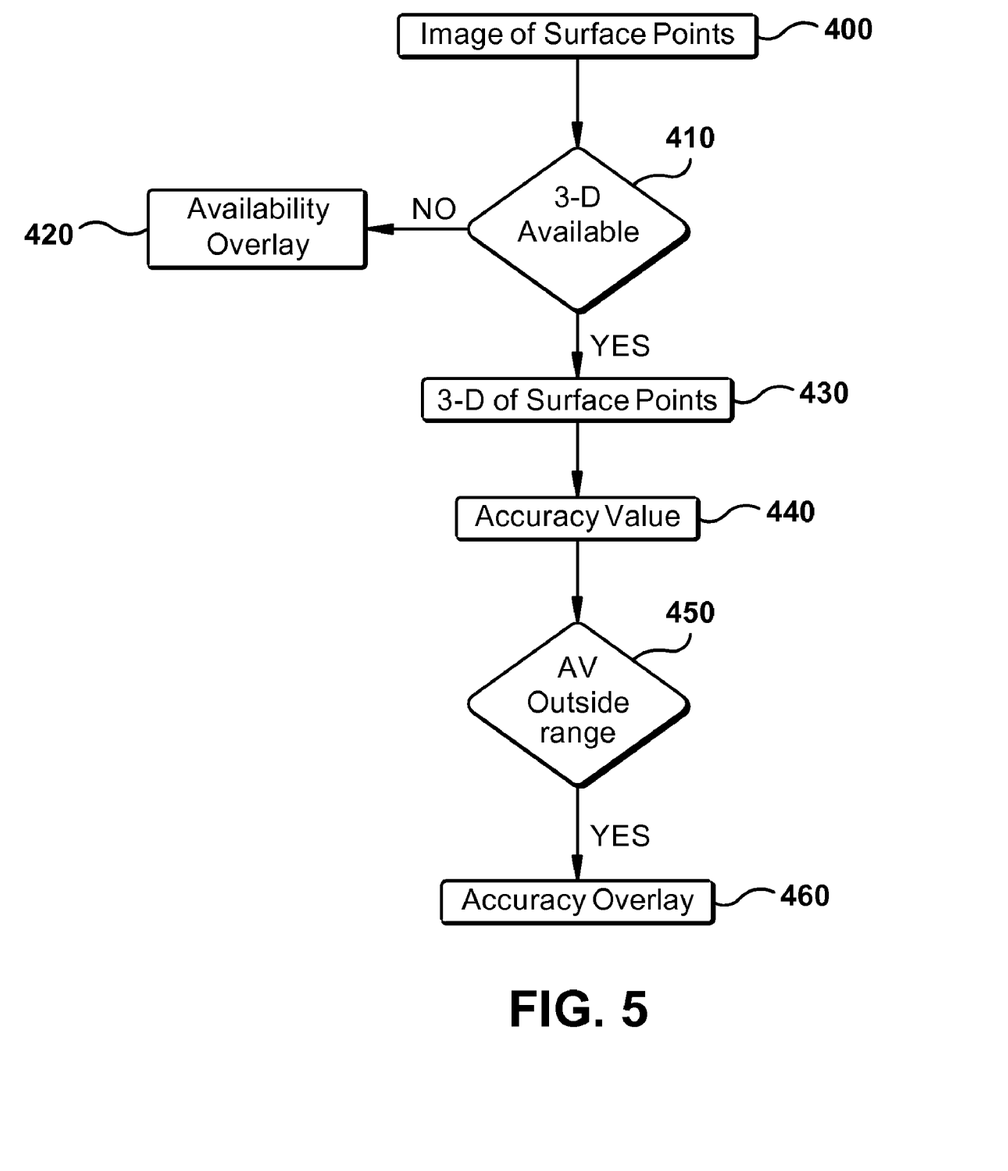
FIG. 5 is a flow diagram of a method for displaying an indication of the quality of the three-dimensional data for a surface of the viewed object shown in the image of FIG. 4 in another exemplary embodiment of the invention.

FIG. 5 is a flow diagram of a method for displaying an indication of the quality of the three-dimensional data for a surface 210 of the viewed object 202 shown in the image of FIG. 4 in another exemplary embodiment of the invention. It will be understood that the steps described in the flow diagram of FIG. 4 can be performed in a different order than shown in the flow diagram and that not all of the steps are required for certain embodiments.

At step 400, and as shown in FIG. 4, the imager 124 of the video inspection device 100 can obtain an image 500 of the surface 210 of a viewed object 202 having an irregularity 204 and display it on a video monitor (e.g., an integral display 170 or external monitor 172). As shown in FIG. 4, a plurality of pixels 231, 232, 233, 234 of the image 500 correspond to a plurality of surface points 221, 222, 223, 224 on the viewed object 202.

At step 410, the CPU 150 of the video inspection device 100 can determine for each of the plurality of pixels 231, 232, 233, 234 corresponding to the plurality of surface points 221, 222, 223, 224 whether three-dimensional coordinates $(x_i, y_i, z_i)$ for the surface point 221, 222, 223, 224 corresponding to the pixel 231, 232, 233, 234 are available. In some areas of the surface 210, three-dimensional coordinates $(x_i, y_i, z_i)$ may not be available for certain surface points 221, 222, 223, 224 due to excessive target distance, pixel saturation, shadowing, etc.

In one embodiment (e.g., where structured light techniques are used to determine the three-dimensional coordinates $(x_i, y_i, z_i)$), the CPU 150 of the video inspection device 100 can determine for each of the plurality of pixels 231, 232, 233, 234 corresponding to the plurality of surface points 221, 222, 223, 224 whether the three-dimensional coordinates $(x_i, y_i, z_i)$ for the surface point 221, 222, 223, 224 corresponding to the pixel 231, 232, 233, 234 are available by analyzing the brightness level of each of the pixels 231, 232, 233, 234. For example, if the brightness level of a pixel 231, 232, 233, 234 is too low (e.g., less than 20 on an 8-bit scale (0-255)), indicating possible excessive shadowing on the corresponding surface point 221, 222, 223, 224, three-dimensional coordinates $(x_i, y_i, z_i)$ for that surface point 221, 222, 223, 224 may not be available. Similarly, if the brightness level of a pixel 231, 232, 233, 234 is too high (e.g., more than 230 on an 8-bit scale (0-255)), indicating possible saturation on the corresponding surface point 221, 222, 223, 224, three-dimensional coordinates ($x_i$, $y_i$, $z_i$) for that surface point 221, 222, 223, 224 may not be available. In this exemplary embodiment, the range of acceptable brightness values would be between 20 and 230. Accordingly, in this embodiment, the CPU 150 of the video inspection device 100 can determine for each of the plurality of pixels 231, 232, 233, 234 whether the brightness level is outside of a range of acceptable brightness values. The CPU 150 of the video inspection device 100 can determine for each of the plurality of pixels 231 whose brightness level is outside of the range of acceptable brightness values that the three-dimensional coordinates ($x_i$, $y_i$, $z_i$) for the surface point 221 corresponding to the pixel 231 are not available. It will be understood that this brightness level determination and range of acceptable brightness levels is exemplary and that the scope of the invention is not limited to any particular brightness level determination.

In another embodiment (e.g., where stereo techniques are used to determine the three-dimensional coordinates ($x_i$, $y_i$, $z_i$)), the CPU 150 of the video inspection device 100 can determine for each of the plurality of pixels 231, 232, 233, 234 corresponding to the plurality of surface points 221, 222, 223, 224 whether the three-dimensional coordinates ($x_i$, $y_i$, $z_i$) for the surface point 221, 222, 223, 224 corresponding to the pixel 231, 232, 233, 234 are available by analyzing the detail level of each of the pixels 231, 232, 233, 234. For example, if the detail level of a pixel 231, 232, 233, 234 is too low (e.g., less than 20 on an 8-bit scale (0-255)) to allow proper stereo matching, three-dimensional coordinates ($x_i$, $y_i$, $z_i$) for that surface point 221, 222, 223, 224 may not be available. In this exemplary embodiment, the range of acceptable detail values would be greater than 20. Accordingly, in this embodiment, the CPU 150 of the video inspection device 100 can determine for each of the plurality of pixels 231, 232, 233, 234 whether the detail level is outside of a range of acceptable detail values. The CPU 150 of the video inspection device 100 can determine for each of the plurality of pixels 231 whose detail level is outside of the range of acceptable detail level values that the three-dimensional coordinates ($x_i$, $y_i$, $z_i$) for the surface point 221 corresponding to the pixel 231 are not available. It will be understood that this detail level determination and range of acceptable detail levels is exemplary and that the scope of the invention is not limited to any particular detail level determination.

In another embodiment (e.g., where stereo techniques are used to determine the three-dimensional coordinates ($x_i$, $y_i$, $z_i$)), the CPU 150 of the video inspection device 100 can determine for each of the plurality of pixels 231, 232, 233, 234 corresponding to the plurality of surface points 221, 222, 223, 224 whether the three-dimensional coordinates ($x_i$, $y_i$, $z_i$) for the surface point 221, 222, 223, 224 corresponding to the pixel 231, 232, 233, 234 are available by determining, for a particular surface point 221, 222, 223, 224 in one stereo image, whether a match exists in the other stereo image. For example, the CPU 150 of the video inspection device 100 can perform a scan of the surface points 221, 222, 223, 224 in one stereo image to determine if there are probable matches in the other stereo image. The CPU 150 of the video inspection device 100 can determine for each of the plurality of pixels 231 where there is no probable match that the three-dimensional coordinates ($x_i$, $y_i$, $z_i$) for the surface point 221 corresponding to the pixel 231 are not available.

In one embodiment, if it is determined that the three-dimensional coordinates ($x_i$, $y_i$, $z_i$) for the surface point 221 corresponding to a pixel 231 are not available, the CPU 150 of the video inspection device 100 can perform additional analysis to assign three-dimensional coordinates to the surface point 221 corresponding to the pixel 231. For example, if the majority of pixels in a certain pixel area (e.g., 9×9) around the pixel 231 have three-dimensional data, interpolation techniques can be used to assign three-dimensional coordinates to the surface point 221 corresponding to the pixel 231.

At step 420, and as shown in FIG. 4, the monitor 170, 172 of the video inspection device 100 can display an availability overlay 250 for each of the plurality of pixels 231 where the three-dimensional coordinates ($x_i$, $y_i$, $z_i$) for the surface point 221 corresponding to the pixel 231 are not available (e.g., three-dimensional coordinates were not originally available and were not assigned based on later interpolation). This availability overlay 250 can be displayed on the image 500 at all times or only at certain times (e.g., when a cursor is moved over a pixel 231 where the three-dimensional coordinates for the surface point 221 corresponding to the pixel 231 are not available or when an operator saves an image 500). The presence of this availability overlay 250 allows an operator to determine whether the image 500 has available three-dimensional data to perform a measurement in the region of interest on the surface 210 (e.g., proximate the defect 204). In one embodiment, the availability overlay 250 for all of the plurality of pixels 231 where the three-dimensional coordinates ($x_i$, $y_i$, $z_i$) for the surface point 221 corresponding to the pixel 231 are not available is the same color (e.g., red). It will be understood that the availability overlay 250 can be displayed later in the flow diagram (e.g., at the same time as step 460 discussed below).

At step 430, the CPU 150 of the video inspection device 100 can determine the three-dimensional coordinates ($x_i$, $y_i$, $z_i$) of the plurality of surface points 222, 223, 224 whose three-dimensional coordinates are available as shown in FIG. 4. As discussed above with respect to step 310, several different existing techniques can be used to provide the three-dimensional coordinates ($x_i$, $y_i$, $z_i$) of the surface points 222, 223, 224.

At step 440, the CPU 150 of the video inspection device 100 can determine an accuracy value for each of the plurality of pixels 232, 233, 234 corresponding to the plurality of surface points 222, 223, 224 whose three-dimensional coordinates ($x_i$, $y_i$, $z_i$) are available, wherein the accuracy value is based on the predicted accuracy of the three-dimensional coordinates ($x_i$, $y_i$, $z_i$) of the surface point 222, 223, 224 corresponding to the pixel 232, 233, 234. In one embodiment, the accuracy value for a pixel 232, 233, 234 can be determined as discussed above with respect to step 320.

At step 450, the CPU 150 of the video inspection device 100 can determine for each of the plurality of pixels 232, 233, 234 having an accuracy value whether the accuracy value is outside of a range of acceptable accuracy values, as discussed above with respect to step 330.

At step 460, and as shown in FIG. 4, the monitor 170, 172 of the video inspection device 100 can display an accuracy overlay 240 for each of the plurality of pixels 232 whose accuracy value is outside of the range of acceptable accuracy values as discussed above with respect to step 340. In FIG. 4, for example, pixel 232 corresponding to surface point 222 has an accuracy value that is outside of the range of acceptable accuracy values. This accuracy overlay 240 can be displayed on the image 500 at all times or only at certain times (e.g., when a cursor is moved over a pixel 232 whose accuracy value is outside of the range of acceptable accuracy values) or when an operator saves an image 500).

In one embodiment, the accuracy overlay 240 and the availability overlay 250 can be displayed together when either a cursor is moved over a pixel 231 where the three-dimensional coordinates ($x_i$, $y_i$, $z_i$) for the surface point 221 corresponding to the pixel 231 are not available or a cursor is moved over a pixel 232 whose accuracy value is outside of the range of acceptable accuracy values.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for displaying an indication of the quality of the three-dimensional data for a surface of a viewed object, the method comprising the steps of:
    obtaining an image of the surface of the viewed object with an imager;
    displaying on a monitor the image of the surface of the viewed object, wherein a plurality of pixels of the image correspond to a plurality of surface points on the viewed object;
    determining the three-dimensional coordinates of the plurality of surface points using a central processing unit;
    determining an accuracy value for each of the plurality of pixels corresponding to the plurality of surface points using the central processing unit, wherein the accuracy value is based on the predicted accuracy of the three-dimensional coordinates of the surface point corresponding to the pixel;
    determining for each of the plurality of pixels having an accuracy value whether the accuracy value is outside of a range of acceptable accuracy values using the central processing unit; and
    displaying on the monitor an overlay for each of the plurality of pixels whose accuracy value is outside of the range of acceptable accuracy values.

2. The method of claim 1, wherein the step of determining an accuracy value for each of the plurality of pixels corresponding to the plurality of surface points comprises determining the difference between at least one of the three-dimensional coordinates from a first set of three-dimensional coordinates of the surface point corresponding to the pixel and at least one of the three-dimensional coordinates from a second set of three-dimensional coordinates of the surface point corresponding to the pixel.

3. The method of claim 2, wherein the step of determining for each of the plurality of pixels having an accuracy value whether the accuracy value is outside of a range of acceptable accuracy values comprises determining whether the difference is outside of the range of acceptable accuracy values.

4. The method of claim 3, wherein the range of acceptable accuracy values is less than a ten percent difference.

5. The method of claim 1, wherein the step of displaying an overlay for each of the plurality of pixels whose accuracy value is outside of the range of acceptable accuracy values occurs when a cursor is moved over a pixel whose accuracy value is outside of the range of acceptable accuracy values.

6. The method of claim 1, wherein the overlay for each of the plurality of pixels whose accuracy value is outside of the range of acceptable accuracy values is colored based on the accuracy value for that pixel.

7. The method of claim 1, wherein the overlay for all of the plurality of pixels whose accuracy value is outside of the range of acceptable accuracy values is the same color.

8. A method for displaying an indication of the quality of the three-dimensional data for a surface of a viewed object, the method comprising the steps of:
    obtaining an image of the surface of the viewed object with an imager;
    displaying on a monitor the image of the surface of the viewed object, wherein a plurality of pixels of the image correspond to a plurality of surface points on the viewed object;
    determining for each of the plurality of pixels corresponding to the plurality of surface points whether the three-dimensional coordinates for the surface point corresponding to the pixel are available using a central processing unit; and
    displaying on the monitor a first overlay for each pixel where the three-dimensional coordinates for the surface point corresponding to the pixel are not available.

9. The method of claim 8, wherein the step of determining for each of the plurality of pixels corresponding to the plurality of surface points whether the three-dimensional coordinates for the surface point corresponding to the pixel are available comprises:
    determining the brightness level for each of the plurality of pixels;
    determining for each of the plurality of pixels whether the brightness level is outside of a range of acceptable brightness values; and
    determining for each of the plurality of pixels whose brightness level is outside of the range of acceptable brightness values that the three-dimensional coordinates for the surface point corresponding to the pixel are not available.

10. The method of claim 8, wherein the step of determining for each of the plurality of pixels corresponding to the plurality of surface points whether the three-dimensional coordinates for the surface point corresponding to the pixel are available comprises:
    determining the detail level for each of the plurality of pixels;
    determining for each of the plurality of pixels whether the detail level is outside of a range of detail level values; and
    determining for each of the plurality of pixels whose detail level is outside of the range of acceptable detail level values that the three-dimensional coordinates for the surface point corresponding to the pixel are not available.

11. The method of claim 8, wherein the step of displaying on the monitor a first overlay for each pixel where the three-dimensional coordinates for the surface point corresponding to the pixel are not available occurs when a cursor is moved over a pixel where the three-dimensional coordinates for the surface point corresponding to the pixel are not available.

12. The method of claim 8, wherein the first overlay for each pixel where the three-dimensional coordinates for the surface point corresponding to the pixel are not available is red.

13. The method of claim 8, further comprising the steps of:
    determining the three-dimensional coordinates of the plurality of surface points whose three-dimensional coordinates are available using the central processing unit;
    determining an accuracy value for each of the plurality of pixels corresponding to the plurality of surface points whose three-dimensional coordinates are available using the central processing unit, wherein the accuracy value is based on the predicted accuracy of the three-dimensional coordinates of the surface point corresponding to the pixel;

determining for each of the plurality of pixels having an accuracy value whether the accuracy value is outside of the range of acceptable accuracy values using the central processing unit; and displaying on the monitor a second overlay for each of the plurality of pixels whose accuracy value is outside of the range of acceptable accuracy values.

14. The method of claim 13, wherein the step of determining an accuracy value for each of the plurality of pixels corresponding to the plurality of surface points whose three-dimensional coordinates are available comprises determining the difference between at least one of the three-dimensional coordinates from a first set of three-dimensional coordinates of the surface point corresponding to the pixel and at least one of the three-dimensional coordinates from a second set of three-dimensional coordinates of the surface point corresponding to the pixel.

15. The method of claim 14, wherein the step of determining for each of the plurality of pixels having an accuracy value whether the accuracy value is outside of a range of acceptable accuracy values comprises determining whether the difference is outside of the range of acceptable accuracy values.

16. The method of claim 15, wherein the range of acceptable accuracy values is less than a ten percent difference.

17. The method of claim 13, wherein the step of displaying on the monitor a second overlay for each of the plurality of pixels whose accuracy value is outside of the range of acceptable accuracy values occurs when a cursor is moved over a pixel whose accuracy value is outside of the range of acceptable accuracy values.

18. The method of claim 13, wherein the second overlay for each of the plurality of pixels whose accuracy value is outside of the range of acceptable accuracy values is colored based on the accuracy value for that pixel.

19. The method of claim 13, wherein the step of displaying on the monitor a first overlay for each pixel whose three-dimensional coordinates for the surface point corresponding to the pixel are not available and the step of displaying second overlay for each of the plurality of pixels whose accuracy value is outside of the range of acceptable accuracy values occurs when either a cursor is moved over a pixel where the three-dimensional coordinates for the surface point corresponding to the pixel are not available or a cursor is moved over a pixel whose accuracy value is outside of the range of acceptable accuracy values.

20. A device for displaying an indication of the quality of the three-dimensional data for a surface of a viewed object comprising:

an imager for obtaining an image of the surface of the viewed object;

wherein a plurality of pixels of the image correspond to a plurality of surface points on the viewed object;

a central processor unit for:

determining the three-dimensional coordinates of the plurality of surface points;

determining an accuracy value for each of the plurality of pixels corresponding to the plurality of surface points, wherein the accuracy value is based on the predicted accuracy of the three-dimensional coordinates of the surface point corresponding to the pixel; and determining for each of the plurality of pixels having an accuracy value whether the accuracy value is outside of a range of acceptable accuracy values; and a monitor for displaying an image of the surface of the viewed object and an overlay for each of the plurality of pixels whose accuracy value is outside of the range of acceptable accuracy values.

* * * * *